(12) United States Patent
Akoum et al.

(10) Patent No.: US 8,720,636 B2
(45) Date of Patent: May 13, 2014

(54) MOTOR VEHICLE HAVING AN ELECTROMOTIVE UNIT AND THE POWER SUPPLY MODULE THEREOF ARRANGED IN THE VICINITY OF A RUNNING GEAR OF THE VEHICLE

(75) Inventors: Hassan Akoum, Saint-Cloud (FR); Olivier Ciesielski, Courbevoie (FR)

(73) Assignee: Peugeot Citroën Automobiles SA, Velizy Villacoublay (FR)

( * ) Notice: Subject to any disclaimer, the term of this patent is extended or adjusted under 35 U.S.C. 154(b) by 64 days.

(21) Appl. No.: 13/516,502

(22) PCT Filed: Dec. 6, 2010

(86) PCT No.: PCT/FR2010/052617
§ 371 (c)(1),
(2), (4) Date: Jun. 15, 2012

(87) PCT Pub. No.: WO2011/083224
PCT Pub. Date: Jul. 14, 2011

(65) Prior Publication Data
US 2012/0255804 A1 Oct. 11, 2012

(30) Foreign Application Priority Data
Dec. 22, 2009 (FR) ...................................... 09 59420

(51) Int. Cl.
  *B60K 1/04* (2006.01)
(52) U.S. Cl.
  USPC .......................................... 180/299; 180/68.5
(58) Field of Classification Search
  USPC ............... 180/65.6, 291, 292, 299, 68.5, 312; 903/951
  See application file for complete search history.

(56) References Cited

U.S. PATENT DOCUMENTS

| | | | | |
|---|---|---|---|---|
| 3,690,397 A | * | 9/1972 | Parker et al. | 180/65.6 |
| 4,453,740 A | * | 6/1984 | von der Ohe et al. | 280/781 |
| 5,460,234 A | * | 10/1995 | Matsuura et al. | 180/65.1 |
| 6,435,556 B1 | * | 8/2002 | Takagi et al. | 280/784 |
| 7,886,861 B2 | * | 2/2011 | Nozaki et al. | 180/232 |
| 2002/0100622 A1 | * | 8/2002 | Shimizu et al. | 180/65.1 |
| 2002/0189873 A1 | * | 12/2002 | Mizuno | 180/65.3 |
| 2012/0255804 A1 | * | 10/2012 | Akoum et al. | 180/291 |

FOREIGN PATENT DOCUMENTS

| | | | | |
|---|---|---|---|---|
| EP | 1266783 A2 | 12/2002 | | |
| EP | 2184219 A1 | 5/2010 | | |
| JP | 2000-92624 | * | 3/2000 | B60K 1/04 |
| JP | 2004-161158 | * | 6/2004 | B60K 1/04 |

* cited by examiner

*Primary Examiner* — Frank Vanaman
(74) *Attorney, Agent, or Firm* — Polster Lieder

(57) ABSTRACT

A vehicle, particularly a motor vehicle, comprising at least one electromotive drive unit and a power supply module capable of supplying the electromotive drive unit, a running gear mechanically coupled to the electromotive unit, and a chassis attached to the body of the vehicle, in the vicinity of the running gear, onto which the electromotive unit and the power supply module are attached, characterized in that the chassis defines a platform attached below the body of the vehicle, between the body of the vehicle and a floor separating a useful space of the vehicle which is part of the passenger compartment or adjacent to the passenger compartment, and in that the chassis is capable of receiving and supporting the electromotive unit and the power supply module, wherein the electromotive unit and the power supply module are arranged on either side of the chassis.

8 Claims, 2 Drawing Sheets

MOTOR VEHICLE HAVING AN ELECTROMOTIVE UNIT AND THE POWER SUPPLY MODULE THEREOF ARRANGED IN THE VICINITY OF A RUNNING GEAR OF THE VEHICLE

CROSS-REFERENCE TO RELATED APPLICATIONS

This application is the US National Stage under 36 U.S.C. §371 of International App. No. PCT/FR2010/052617 filed Dec. 6, 2010, and which claims priority to French App. No. 059420 filed Dec. 22, 2009.

STATEMENT REGARDING FEDERALLY SPONSORED RESEARCH

Not Applicable.

BACKGROUND

The present invention relates to automotive vehicles of the hybrid thermal/electric type or all electric type, either rechargeable or not.

Such vehicles comprise at least one electrical traction machine supplied by an electrical power supply, whereby said machine is located in the vicinity of a drive axle that drives the wheels of this axle.

The term "electric motor" designates the assembly including the electrical machine and a gear box connected to the output shaft of the machine, which is integrally connected with the rotor of the electrical machine.

The gear box adapts the speed of the electrical machine to the torque required at the wheels of the vehicle.

The term "electrical power supply" designates the assembly including a block of electrical accumulator batteries and an electronic power unit. This type of power unit comprises, in particular, a DC/DC direct voltage conversion circuit to adapt the voltage supplied by the block of batteries to the voltage accepted by the on-board network, which is in general 12V, and an inverter circuit which transforms the direct current voltage delivered by the block of batteries into alternative current voltage when the machine operates in a generator mode. The power unit can be unitary with the battery block or be separate from it.

In the case of a so-called front wheel drive vehicle, in other words a vehicle in which the combustion engine is connected to the front axle of the vehicle to provide traction to the vehicle, the trunk is of course located in the rear of the vehicle behind the last row of seats of the vehicle.

The trunk is delimited by the rear part of the vehicle roof and by a floor, also referred to as a trunk floor, which separates and isolates the trunk from the vehicle body, which supports the rear axle of the vehicle.

In this area, the body also supports the exhaust muffler and the fuel tank or part of the fuel tank.

The height of the trunk between the trunk floor and the rear part of the vehicle roof defines the height of the trunk according to the Z-axis, in a three-dimensional reference system normally used to reference a vehicle in space, and therefore depends on the space occupied by the above mentioned elements which are situated directly under the trunk floor.

A rear axle can also be, for instance, a rear axle type with deformable cross beam.

This type of rear axle is generally "H" shaped, whereby the two parallel branches of the "H" define generally longitudinal arms, and the central bar of the H defines a transverse torsion bar referred to as a deformable cross beam, which integrates a so-called stabilization bar, also referred to as an anti-roll bar.

The first ends of the longitudinal arms are connected respectively to the rear wheels of the vehicle through the intermediary of pivot forming linkages, and the second ends are connected to the body of the vehicle through the intermediary of elastic linkages, which also form pivot linkages on the body.

SUMMARY

A motor vehicle is disclosed which accommodates the electric motor and its power supply in the vicinity of one of the axles of the vehicle, and in particular, in the vicinity of the rear axle of the vehicle, under the trunk, with a reduced footprint in the Z-axis to limit the impact of this footprint on the usable volume of the cabin or the trunk.

An electric motor installed in the vicinity of the front axle of a vehicle, providing electrical traction to the vehicle, is known from document EP 1 266 783.

The electric motor includes an electrical machine and its gear box. It is installed transversally relative to the vehicle, whereby the axis of the gear box corresponds with the wheel axis.

The electric motor mounts on the first level of a two level chassis. The first chassis level mounts and suspends to the body of the vehicle.

The second chassis level, surmounting the electric motor, serves as support for a fuel cell and a power command unit mounted above the fuel cell.

This kind of stacking along the Z-axis of the vehicle is relatively cumbersome and transposing this stack to the rear of the vehicle in the vicinity of the rear axle is unacceptable for preserving to the maximum the useful volume of cabin or trunk.

The disclosed vehicle remedies this drawback by offering a compact installation to optimize the footprint of the electric motor and its power supply in order to limit its impact on the useful volume of cabin and trunk.

Another advantage of the disclosed installation is that the electric motor and its power supply (battery block) are located in the same space under the body.

To this end, a vehicle, specifically an automotive vehicle, is disclosed which comprises at least an electric motor that provides traction and an electrical power supply suitable for supplying the electric motor, a drive axle mechanically coupled with the electric motor, and a chassis attached to the body of the vehicle, in the vicinity of the axle, on which the electric motor and the power supply are mounted.

The chassis delimits a platform mounted under the body of the vehicle, between the body of the vehicle and a floor separating the useful volume of the vehicle which is part of the cabin or adjacent to the cabin, and in that the chassis is suitable for receiving and supporting the electric motor and the power supply, whereby the electric motor and the power supply are disposed on both sides of the chassis.

In another embodiment, the chassis comprises three mounting means suitable for suspending the electric motor under the chassis and arranged in such manner as to ensure isostatic installation of the electric motor relative to the chassis.

In another embodiment, the chassis comprises means forming a support for the power supply, whereby the support forming means are flush with the chassis.

In another embodiment, the chassis is constructed with tubular elements assembled to each other and defining a quadrilateral delimiting a surface for receiving the power supply.

In another embodiment, the fixation means of the electric motor and the support forming means for the power supply are integrally connected to the tubular elements.

In another embodiment, the axle is a rear axle with deformable cross beam integrating an anti-roll bar.

In another embodiment, the chassis, equipped with the electric motor and the power supply, is located in the immediate vicinity and behind the deformable cross beam.

In another embodiment, the chassis equipped with the electric motor and the power supply, occupies minimum space in direction of the Z-axis, and the footprint remains compatible with installation under the floor of the vehicle and in the vicinity of the rear axle.

In another embodiment, the floor corresponds with the floor of the vehicle trunk.

In another embodiment, the floor corresponds with the floor of the cabin which is suitable for supporting a third row of seats.

DESCRIPTION OF THE DRAWINGS

Other characteristics and advantages of the invention will become clear during the following description, provided as an example and with reference to the attached drawings, in which.

Corresponding reference numerals indicate corresponding parts throughout the several figures of the drawings.

DETAILED DESCRIPTION

Figure 1:
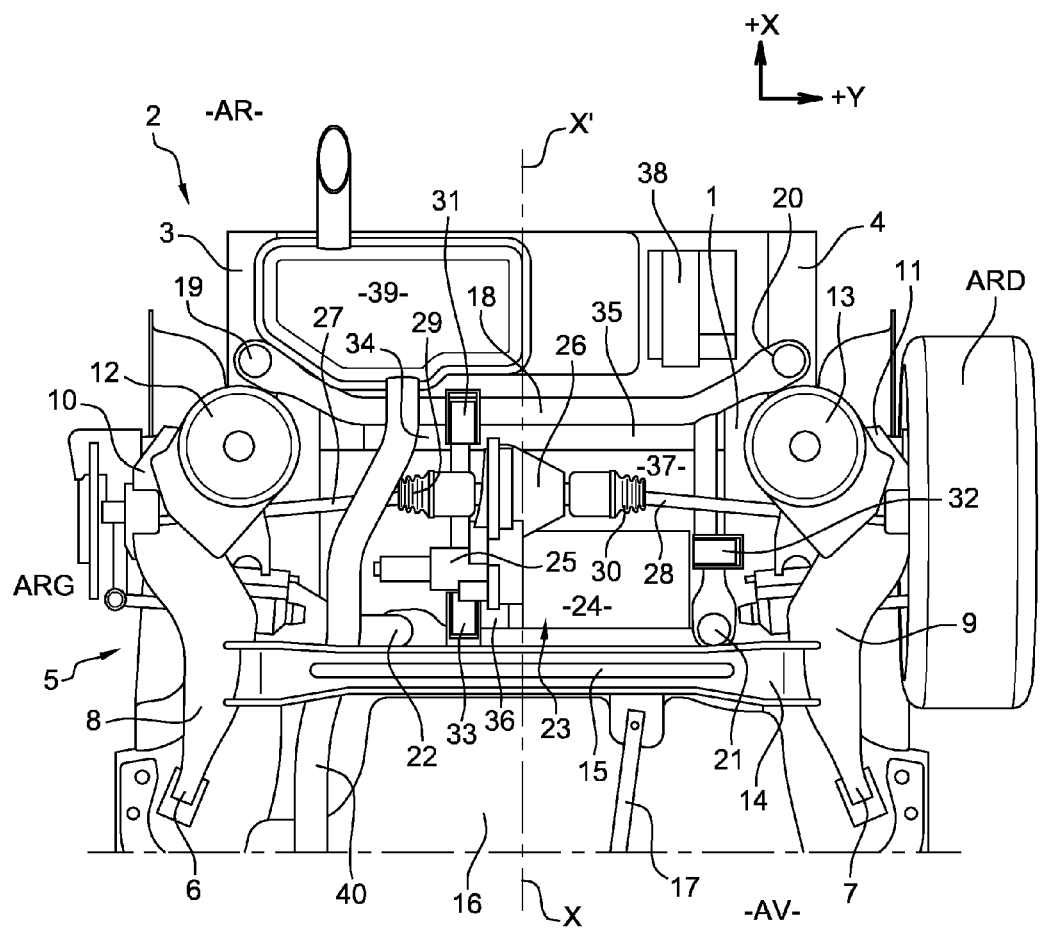
FIG. 1 is a bottom view of a rear end of an automotive vehicle on which an electric motor and a power supply are installed.

The following detailed description illustrates the claimed invention by way of example and not by way of limitation. The description clearly enables one skilled in the art to make and use the claimed invention, describes several embodiments, adaptations, variations, alternatives, and uses of the claimed invention, including what is presently believed to be the best mode of carrying out the claimed invention. Additionally, it is to be understood that the disclosure is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

The reference system used in the figures is a three-dimensional reference system XYZ normally used by a person skilled in the art for representing a vehicle in space.

This type of reference system is used in particular in document FR 0956234.

A front of the vehicle is identified by the letters AV and a rear end of the vehicle by the letters AR.

FIG. 1 shows the underside of the rear end of body 1 of vehicle 2, which can be a hybrid vehicle (thermal/electrical) or an all-electric vehicle, either rechargeable or not.

The underside of body 1 supports various elements which are described below.

The bumper is not shown, while rear shock absorbers 3 and 4 can be seen which extend along the longitudinal members of the structure of body 1.

FIG. 1 shows a rear axle 5 of the vehicle with an "H" shaped deformable cross beam. The axle 5 is attached to body 1 of vehicle 2 through the intermediary of two pivot linkages 6 and 7 which are integrally connected to the two ends of the front longitudinal arms 8 and 9, respectively. The ends of the two rear arms 10 and 11 are connected respectively to the two rear right wheel ARD and the rear left wheel ARG, respectively, of which only one, the right rear wheel ARD, is shown. These ends also support respectively two caps 12 and 13 which are configured for receiving the shock absorbers of the rear axle 5, which are not shown in FIG. 1. A deformable cross beam 14, with a U-shaped section, connects the two longitudinal arms 6, 10 and 7, 11 among them. The cross beam 14 integrates an anti-roll bar 15.

A portion of fuel tank 16, with a mounting system 17 attached to body 1, is shown in front of axle 5.

A tubular chassis 18 is behind deformable cross beam 14. The tubular chassis 18 has a generally rectangular shape which is mounted to body 1 by means of four elastic mounts 19-22.

Chassis 18 supports the electric motor 23 which comprises an electrical machine 24 and a gear box 25 connected to the rotor of the electrical machine 24.

Chassis 18 will be described in more detail hereafter with reference to FIG. 3.

The rear wheels ARG, ARD are mechanically connected to gear box 25 through the intermediary of a differential 26, which is connected with the output of gear box 25. The differential 26 couples to the two transmission arms 27 and 28 and their respective constant velocity joints 29 and 30, also referred to as universal joints.

The electric motor 23 mounts on chassis 18 through the intermediary of three elastic linkages 31-33 and is arranged to ensure isostatic installation of the electric motor 23 relative to chassis 18.

FIG. 1 also shows in the back end of chassis 18, three flat supports, forming pads 34-36, which are integrally connected with chassis 18.

These three pads 34-36 receive the power supply 37 including a block of accumulator batteries. An electronic power unit 38 is directly mounted to body 1 behind chassis 18 and therefore behind the battery block 37. In this installation, the electronic power unit 38 is offset from the battery block 37.

The muffler 39 is also arranged and mounted under the body 1 behind the tubular chassis 18 and is laterally offset relative to the longitudinal axis XX' of the vehicle passing through the median plane of the vehicle, also referred to as origin plane Y.

Also in reference to FIG. 1, the exhaust line extends substantially parallel to the longitudinal axis X-X' of the vehicle 2 and passes successively from the front AV to the rear AR of vehicle 2 above the deformable cross bar 14 in the vicinity of the intersection of cross bar 14 and longitudinal arm 8, then descends to pass under the transmission shaft 27 and climbs again up to chassis 18 before rejoining the muffler 39. In its most protruding part under body 1 of vehicle 2, the exhaust line 40 is at the same level as the lower part of the electric motor 23.

Figure 2:
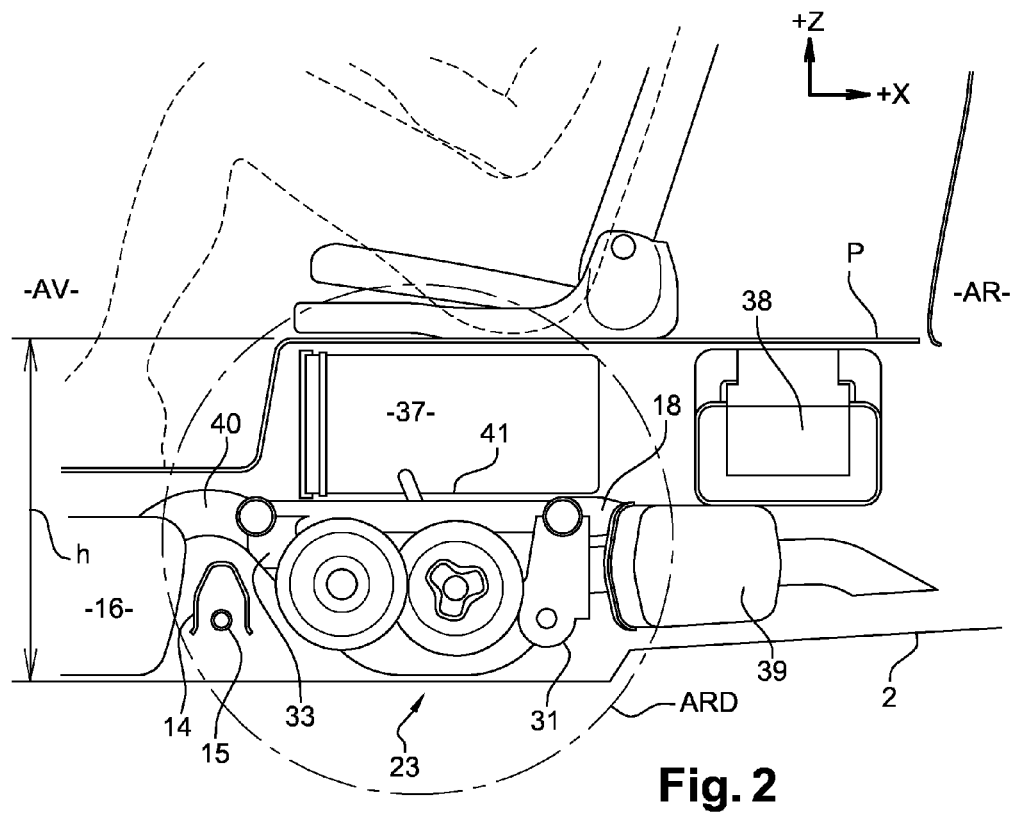
FIG. 2 is a rear side view of the vehicle showing the electric motor and its power supply and a chassis supporting both.

With reference to FIG. 2, which represents the back end of vehicle 2 in side view, only the above described elements are shown, which have a direct impact on the footprint in the Z-axis.

The contours of the body of the vehicle 2 and of the right rear wheel ARD of vehicle 2 are shown in phantom line in order not to overload the figure. Floor P on which is shown a third row seat is shown in solid line and its occupant is shown in phantom.

FIG. 2_shows from low to high, between the lower side of body 2 and floor P, according to the Z-axis, the electric motor 23 in the lower part of body 2 of the vehicle, the tubular chassis 18 supporting the electric motor 23, and the supply group 37 including the battery block.

The tubular chassis 18 defines a platform under which is mounted in suspension the electric motor 23, whereby the upper side of the platform supports the battery block 37. The battery block 37 has the general shape of a parallelepiped and its rectangular base cooperates with the upper surface 14 of chassis 18, of which the tubular assembly, such as a welded mechanical construction, defines a quadrilateral delimiting this upper surface 41.

Figure 3:
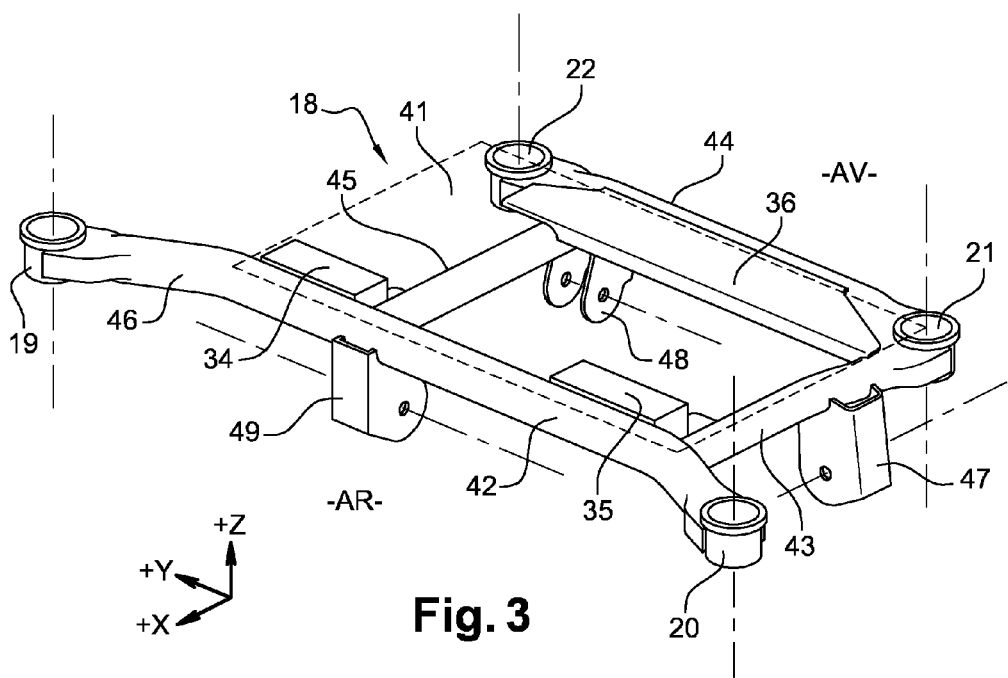
FIG. 3 is a perspective view of the chassis suitable for supporting the electric motor and the power supply of the vehicle.

FIG. 3 illustrates a tubular chassis 18 suitable for receiving and supporting an electric motor 23 and its power supply 37.

As previously described, chassis 18 comprises an assembly of tubular elements with a circular section or almost circular section.

Four tubular elements 42-45 are assembled together to define a platform suitable for receiving and supporting the electric motor 23 as well as its power supply 37.

The tubes 42-45 form parallel pairs. Two parallel elements 43 and 45 of the four tubular elements 42-45, have identical lengths and define respectively two so-called longitudinal tubular elements: a left tubular element 45 and a right tubular element 43.

The two other tubular elements 42 and 44 define respectively two so-called transverse tubular elements: a front tubular element 44 and a rear tubular element 42.

The rear tubular element 42 is longer than the front tubular element 44 and one of its ends extends beyond the corresponding end of the front tubular element 44.

The ends of tubular elements 42-45 support elastic pivot linkage type mounts 19-22, of which the pivot axis extends according to the Z-axis.

One end of the front tubular element 44 coincides with one end of the right tubular element 43.

The extension 46 of the rear tubular element 42 allows for moving mount 19 past the muffler 39 for its mounting to the body 1 of the vehicle 2. In the described installation, the muffler 39 is laterally offset relative to the axis X-X'.

In this way, chassis 18 comprises four mountings 19-22 which ensure the flexible mounting of chassis 18 to body 1 and therefore of the assembly including the electric motor 23 and power supply 37.

Furthermore, the tubular chassis 18 comprises three mounting means 47-49 suitable for supporting the electric motor 23 in an isostatic manner. These mounting means 47-49 define clevises, each suitable for receiving a respective pivot link 32, 31, 33 of which two, 48 and 49, have a pivot axis extending according to the Y-axis and the third 47 according to the X-axis.

Furthermore, the tubular chassis 18 comprises three pads 34-36 integrally connected with tubular elements 42-45. A first pad 36, the longest, links the left tubular element 45 and the right tubular element 43 while running along front tubular element 44. The second and third pads 34 and 35 are arranged respectively in the angles formed by the left tubular element 45 and the rear tubular element 42, and the right tubular element 43 and the rear tubular element 42. The widths of pads 34-36 are approximately identical and they are flush with the upper part of the tubular elements 42-45 so as to present a receiving surface 41 for the base of the electrical module 37. This receiving surface 41 is symbolized by a closed dashed line.

The length and width of pads 34-36 are determined in order to offer an optimal seat for the power supply 37.

The assembly formed by the chassis equipped with the electric motor and the power supply defines a compact and modular assembly of which the dimension h according to the Z-axis is optimized in such a manner as to be compatible with the underbody installation between the drive axle and the floor of the vehicle. The floor can separate a useful volume of the vehicle, which is part of the cabin, or adjacent to the cabin.

The assembly is called modular because it can be mounted rapidly under the body and is rather easily adapted under the body of a vehicle, which was not planned in advance for supporting an electrical traction machine to drive the rear wheels of the vehicle.

The installation advantageously exploits the form of the rear axle with the deformable cross beam in order to optimize this installation. However, any other axle architecture can be envisioned without exceeding the scope of the claimed invention to the extent that the installation of the compact assembly of electric motor, chassis and power supply, within this architecture, remains compatible with minimum footprint in the Z-axis.

The invention claimed is:

1. An automotive vehicle, comprising:
    an electric motor;
    an electrical power supply suitable for supplying the electric motor and providing traction to a drive axle mechanically connected with the electric motor; and
    a tubular chassis with a generally rectangular shape, mounted to the body of the vehicle, in the vicinity of the axle, on which is mounted the electric motor and the power supply on both sides of the chassis, whereby the upper side of the chassis defines a platform supporting the power supply, wherein the axle is a rear axle with a deformable cross beam integrating an anti-roll bar, whereby the chassis equipped with the electric motor and power supply is installed under the body between the axle and a floor of vehicle and is located in the vicinity of and behind the deformable cross bar.

2. A vehicle according to the claim 1, wherein the chassis comprises three mounting devices suitable for suspending the electric motor under the chassis and which are arranged to ensure an isostatic installation of the electric motor relative to the chassis.

3. A vehicle according to claim 1, wherein the chassis comprises a support forming device for the power supply, whereby the support forming device is flush with the chassis.

4. A vehicle according to claim 1, wherein the chassis is constructed from a plurality of tubular elements assembled to each other to define a quadrilateral delimiting a receiving surface for the power supply.

5. A vehicle according to claim 4, wherein mounting devices suitable for the electric motor to the chassis and a support forming device for the power supply are integrally connected with the tubular elements.

6. A vehicle according to claim 1, wherein the chassis, equipped with the electric motor and the power supply, has a minimum footprint according to a Z-axis, whereby the footprint remains compatible with the installation under the floor of the vehicle and in the vicinity of the rear axle.

7. A vehicle according to claim 6, wherein the floor corresponds with the floor of the vehicle trunk.

8. A vehicle according to claim 6, wherein the floor corresponds with the floor of the cabin which is suitable for supporting a third row of seats.

\* \* \* \* \*